July 15, 1930. G. STREMBERGER 1,770,717
PNEUMATIC BRAKE
Filed Sept. 7, 1927
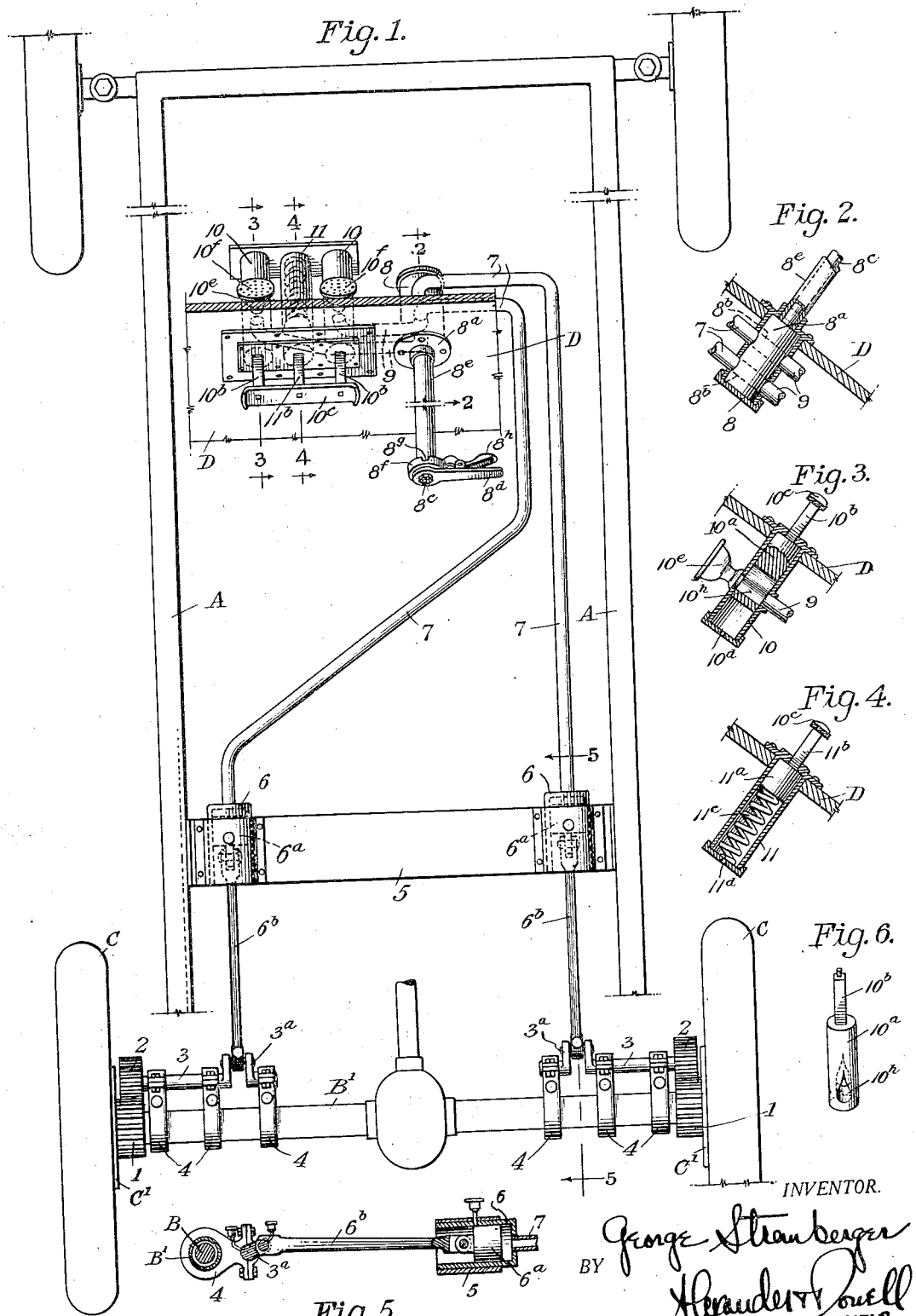
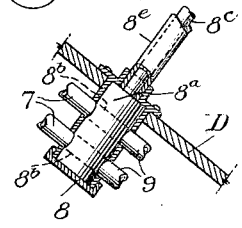
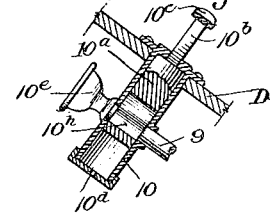
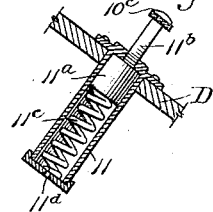
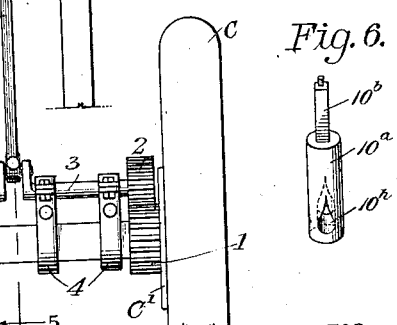

Patented July 15, 1930

1,770,717

UNITED STATES PATENT OFFICE

GEORGE STREMBERGER, OF BUTTE, MONTANA

PNEUMATIC BRAKE

Application filed September 7, 1927. Serial No. 217,927.

This invention is a novel improvement in pneumatic brakes for vehicles such as automobiles, street cars, busses, locomotives, and the like, or for rotating shafts of motors, and machinery of various kinds, and the principal object of the invention is to provide a simple and efficient pneumatic brake having separately and independently driven air pumps for each wheel or rotating shaft; each air pump having a combined inlet and exhaust air pipe; and all said pipes having a common normally open foot operated valve for progressively increasing the air resistance in the pipes as the valve is closed to brake the wheels or shafts separately and independently; and a hand operated valve common to all the pipes interposed between the cylinders and the foot valve for positively closing the pipes when it is desired to lock the wheels or shaft against rotation. Other minor objects of the invention will be hereinafter set forth.

I will explain the invention with reference to the accompanying drawing which illustrates one practical embodiment thereof to enable others to adopt and use the same; and will summarize in the claims the novel features of construction, and the novel combinations of parts, for which protection is desired.

In said drawings:—

Figure 1 is a diagrammatic view of a conventional automobile chassis showing my novel pneumatic brake applied to the rear wheels thereof;

Fig. 2 is a section on line 2—2, Fig. 1;
Fig. 3 is a section on line 3—3, Fig. 1;
Fig. 4 is a section on line 4—4, Fig. 1;
Fig. 5 is a section on line 5—5, Fig. 1;
Fig 6 is a detail of one of the foot valve plungers.

My novel pneumatic brake is illustrated in connection with an automobile chassis having side frames A, and a rear driving axle B enclosed in a housing B', with rear wheels C connected with the driving axle B by wheel plates C'.

Upon each wheel plate C' is fixedly mounted a gear 1 coaxial with shaft B and meshing with a pinion 2 on a crank shaft 3 journalled in a series of bearing arms 4 fixedly mounted on the axle casing B'; one such crank shaft 3 being provided for each rear wheel C. Each crank shaft 3 is provided with a crank $3^a$.

Supported on a plate 5 extending between the side frames A are two pump cylinders 6 having pistons $6^a$ reciprocably mounted therein and connected by piston rods $6^b$ to their respective cranks $3^a$ (Fig. 5) whereby as wheels C revolve the two pistons $6^b$ will be reciprocated independently of each other.

An air pipe 7 extends from each pump 6 to the casing 8 of a hand valve (Fig. 2) which casing is preferably secured to the foot boards D of the vehicle adjacent the steering column (not shown). In casing 8 is a cylindrical valve $8^a$ making a tight rotary fit within said casing. Valve $8^a$ is provided with two diametrically disposed bores $8^b$ extending from points opposite the ends of pipes 7 respectively to the opposite side of casing 8 and into the ends of a second pair of pipes 9 leading to a foot valve, hereinafter described. A control rod $8^c$ extends through the upper end of casing 8 adjacent the steering post (not shown), said rod having on its upper end a lever $8^d$, for rotating valve $8^a$. Preferably rod $8^c$ is housed in a fixed casing $8^e$ which has a collar $8^f$ on its upper end below lever $8^d$, the collar $8^d$ having notches $8^g$ on its lower face adapted to be engaged by the end of a pivoted spring actuated latch $8^h$ mounted on the underside of the lever $8^d$, whereby valve $8^a$ can be locked in normal position so that bores $8^b$ establish communication between the respective pipes 7 and 9; or valve $8^a$ may be locked in position wherein the bores $8^b$ are out of register with pipes 7 and 9, thereby positively closing pipes 7 and locking the piston $6^a$ of the pumps for each wheel against movement.

Pipes 9 lead to separate valve casings 10 (Fig. 3) attached in any desired manner to the under side of the foot boards D of the vehicle adjacent the usual clutch pedal (not shown), casings 10 being disposed in spaced parallel relation as shown in Fig. 1. In the upper end of each casing 10 is a plunger $10^a$ having a rod $10^b$ extending through the upper end of the casing and through the foot boards D. A foot pedal 10° connects the upper ends of both rods 10ᵇ for simultaneously actuating the plungers 10ᵃ. An opening 10ᵈ in the bottom of each casing 10 permits the escape of air therefrom when the plungers 10ᵃ are depressed. Extending into the side of each casing 10 diametrically opposite the pipe 9 is a breather cup 10ᵉ having a screen 10ᶠ or the like across its outer end for preventing entry of dust, dirt, or other foreign matter into the pipes, valves, and cylinders. Extending through each plunger 10ᵃ is a substantially wedge shaped bore 10ʰ (Fig. 6) having its lower portion substantially conforming in cross-section with the pipe 9 so that when the plunger is in normal raised position communication will be normally established between pipe 9 and breather cup 10ᵉ. The sides of the upper portion of bore 10ʰ however converge to a point so that as each plunger 10ᵃ is depressed a progressively increasing air resistance will be set up in pipe 9 which resistance is communicated through valve 8 and pipes 7, back to the cylinders 6ᵃ.

Between and parallel with the casings 10 is a similar casing 11 (Fig. 4) housing a plunger 11ᵃ provided with a rod 11ᵇ on its upper end connected to the center of foot lever 10ᶜ; and a coil spring 11ᶜ in the casing interposed between the piston 11ᵃ and the bottom of the casing normally urges the foot lever 10ᶜ and the plungers 10ᵃ into normal raised position wherein bores 10ʰ register with pipes 9 and cups 10ᵉ. A hole 11ᵈ in the bottom of casing 11 permits escape of air from the casing as plunger 11ᵃ is depressed.

In operation: Whenever the vehicle is in motion the pump cylinders 6 of each wheel C are pumping separately and independently without interfering with each other, both pistons 6ᵃ in the pump cylinders drawing air into the cylinders and forcing the air out again through their respective air pipes 7 and 9 and perforated screens 10ᶠ, provided hand valve 8ᵃ is in normal position with the bores 8ᵇ registering with pipes 7 and 9, and also provided the foot-lever 10ᶜ is in normal raised position with the bores 10ʰ registering with pipes 9 and breather cups 10ᵉ.

The hand control air valve 8 has no direct air exhaust and intake itself, but is simply a double air valve, whereby if the valve is completely open, air may pass freely back and forth through the valve and through the pipes 7 and 9 without resistance from the foot control breather cups 10ᵉ into the air cylinders 6, and out again as the pistons 6ᵃ are reciprocated. However, since the air must pass through both the foot and hand control valves, either one or both of these two valves may completely shut off the air passage in pipes 7 and 9, and as soon as the air passage is thus closed by one of the valves, the air in both air pumps is immediately compressed and the pistons in both air pumps will be locked against movement in either direction since the pistons cannot draw air into the pumps, nor force the air out of same. Such pneumatic lock on both pistons in both air pumps acts as a brake, causing both rear wheels C of the vehicle to lock against rotation. The wedge shaped bores 10ʰ in foot valve plungers 10ᵃ however, permit the foot pedal 10ᶜ to be gradually depressed without locking the wheels against rotation until the bores have passed entirely below the ends of pipes 9; and as foot lever 10ᶜ is depressed by reason of the converging side walls of bores 10ʰ, a progressively increasing air resistance is set up in pipes 9 to gradually slow down the rotation of wheels C.

I do not limit my invention to the exact form shown in the drawing, for obviously changes may be made therein within the scope of the claims.

I claim:

1. In a pneumatic brake for wheeled vehicles, pump cylinders mounted adjacent the wheels each cylinder having a piston reciprocated by its related wheel; non-communicating pipes leading from the heads of the respective cylinders; and normally, open valve means interposed in all the said pipes adapted to simultaneously close all the said pipes as the valve is operated, whereby the air resistance set up in each pipe will be proportional to the speed of rotation of its related wheel.

2. In a brake as set forth in claim 1, said valve means comprising valve casings interposed in the respective pipes; a reciprocable plunger in each casing having a bore normally registering with its related pipe; and means for simultaneously actuating all said plungers.

3. In a brake as set forth in claim 1, said valve means comprising valve casings interposed in the respective pipes; a reciprocable plunger in each casing having a bore normally registering with its related pipe, means for simultaneously actuating all said plungers, the bore of each plunger being of substantially wedge-shaped cross-section, the lower portion of each bore conforming with the cross-section of the pipe, and the walls of the upper portions thereof converging to a point, whereby progressively increasing air resistances in the respective pipes will be set up as the valve is closing.

In testimony that I claim the foregoing as my own, I affix my signature.

GEORGE STREMBERGER.